United States Patent
Moake (10) Patent No.: US 9,933,532 B2
(45) Date of Patent: Apr. 3, 2018

(54) TEMPERATURE CORRECTION OF A GAMMA DETECTOR

(71) Applicant: Halliburton Energy Services, Inc., Houston, TX (US)

(72) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/032,530

(22) PCT Filed: Dec. 4, 2013

(86) PCT No.: PCT/US2013/073088
§ 371 (c)(1),
(2) Date: Apr. 27, 2016

(87) PCT Pub. No.: WO2015/084339
PCT Pub. Date: Jun. 11, 2015

(65) Prior Publication Data
US 2016/0274252 A1    Sep. 22, 2016

(51) Int. Cl.
*G01T 1/40*     (2006.01)
*E21B 47/00*    (2012.01)
*E21B 49/00*    (2006.01)
*E21B 47/10*    (2012.01)
*G01V 5/04*     (2006.01)
(Continued)

(52) U.S. Cl.
CPC ............ *G01T 1/40* (2013.01); *E21B 47/00* (2013.01); *E21B 47/1015* (2013.01); *E21B 49/00* (2013.01); *G01V 5/04* (2013.01); *E21B 3/00* (2013.01); *E21B 47/024* (2013.01)

(58) Field of Classification Search
CPC ........................................................ G01T 1/40
See application file for complete search history.

(56) References Cited

U.S. PATENT DOCUMENTS 4,060,726 A   11/1977   Luitwieler et al.
4,220,851 A    9/1980   Whatley, Jr.
(Continued)

FOREIGN PATENT DOCUMENTS

CA   2230919      10/2001
EP   0134619 B1   11/1988
(Continued)

OTHER PUBLICATIONS

International Search Report and Written Opinion, Application No. PCT/US2013/073088; 14 pgs., dated Sep. 3, 2014.
(Continued)

*Primary Examiner* — David Porta
*Assistant Examiner* — Hugh H Maupin
(74) *Attorney, Agent, or Firm* — Baker Botts L.L.P.

(57) ABSTRACT

A logging tool may include a stabilization source configured to emit gamma rays, a gamma ray detector configured to collect gamma rays from the stabilization source and a formation and an analysis module. The analysis module may be configured to determine a photopeak of the stabilization source in a gamma ray spectrum including counts of the gamma rays collected by the gamma ray detector and perform resolution calculations using the photopeak to determine a resolution of the gamma ray detector.

20 Claims, 6 Drawing Sheets

(51) Int. Cl.
*E21B 3/00* (2006.01)
*E21B 47/024* (2006.01)

(56) References Cited

U.S. PATENT DOCUMENTS

| | | | |
|---|---|---|---|
| 4,433,240 A * | 2/1984 | Seeman | G01V 5/06 250/256 |
| 5,272,336 A | 12/1993 | Moake | |
| 5,525,797 A | 6/1996 | Moake | |
| 5,600,135 A * | 2/1997 | Jacobson | G01T 1/40 250/261 |
| 5,912,460 A | 6/1999 | Stoller et al. | |
| 6,051,830 A | 4/2000 | Moake | |
| 6,289,283 B1 | 9/2001 | Plasek | |
| 7,544,928 B2 | 6/2009 | Hassan et al. | |
| 8,063,356 B1 | 11/2011 | Zhou et al. | |
| 8,431,885 B2 | 4/2013 | Roscoe et al. | |
| 2006/0065824 A1 | 3/2006 | Mickael | |
| 2010/0301198 A1 * | 12/2010 | Berheide | G01T 1/202 250/252.1 |
| 2011/0191030 A1 | 8/2011 | Roberts et al. | |
| 2011/0284731 A1 | 11/2011 | Roscoe et al. | |
| 2012/0016588 A1 | 1/2012 | Evans et al. | |

FOREIGN PATENT DOCUMENTS

| | | |
|---|---|---|
| WO | 2013059394 | 4/2013 |
| WO | 2013078263 | 5/2013 |

OTHER PUBLICATIONS

Mathis, "The Effect of Detector Temperature on the Formation Density Log", SPWLA 31 Annual Logging Symposium, 9 pgs., 1990.

Moake, "A New Approach to Determining Compensated Density and PE Values with a Spectral-Density Tool", SPWLA 32 Annual Logging Symposium, 24 pgs., 1991.

Reeder et al, "Performance of Large NaI(TI) Gamma-Ray Detectors Over Temperature -50° C. to +60° C.", Pacific Northwest National Laboratory. 46 pgs., Jun. 2004.

"Multi-Sensor Gamma Ray Tool (MGT)" Manual, National Science Foundation Joint Oceanographic Institutions, Inc., 28 pgs., Feb. 2004.

International Preliminary Report on Patentability, Application No. PCT/US2013/073088; 11 pgs., dated Jun. 16, 2016.

Examination Report, Australian Application No. 2013406808; 3 pages, dated Jul. 18, 2016.

Office Action, Canadian Patent Application No. 2929368, dated Apr. 5, 2017; 4 pages, dated Apr. 5, 2017.

* cited by examiner

TEMPERATURE CORRECTION OF A GAMMA DETECTOR

RELATED APPLICATION

This application is a U.S. National Stage Application of International Application No. PCT/US2013/073088 filed Dec. 4, 2013, which designates the United States, and which is incorporated herein by reference in its entirety.

BACKGROUND

The present disclosure relates generally to drilling operations and, more particularly, to temperature correction of a gamma detector.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

When performing subterranean operations, it is often desirable to obtain information about the formation.

The basic techniques for density logging for earth formations are well known. Generally, a density logging tool consists of a logging source that emits gamma rays and one or more detectors that detect gamma rays. Gamma rays from the logging source pass into the earth formations. Some of the gamma rays are scattered back into the tool and detected by one of the detectors. The detected gamma rays are processed to obtain a measure of the formation density. In some cases a measure of the lithology is also obtained. The measured formation properties may be recorded as a function of the tool's depth or position in the borehole, yielding a formation log that can be used to analyze the formation.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure relates generally to subterranean drilling operations and, more particularly, the present disclosure relates to formation sensing systems, apparatus, and methods.

The present disclosure in some embodiments provides methods and systems for analyzing characteristics of a subterranean formation (e.g., lithology, density, resistivity, dielectric constant, or permittivity). The methods and systems of some embodiments may include one or more logging tools. In some embodiments, a logging tool may include a tool body and one or more antennas, emitters, and detectors, each of which may act as a transmitter and/or a receiver of an electromagnetic signal or signals.

Such electromagnetic signal(s) may be used to determine any suitable characteristic, such as the lithology, density, resistivity, dielectric constant, or permittivity of the formation. For example, the logging tools of some embodiments may measure the count of gamma rays received relative to the number of gamma rays sent. These measurements may be made at each of one or more receiving antennas or detectors in response to signals transmitted by one or more transmitting sources. The count of gamma rays may be used to determine, for example, whether a given portion of a formation includes shale, sandstone, gypsum, coal, limestone, halite, dolomite, or combinations of such substances.

Figure 1:
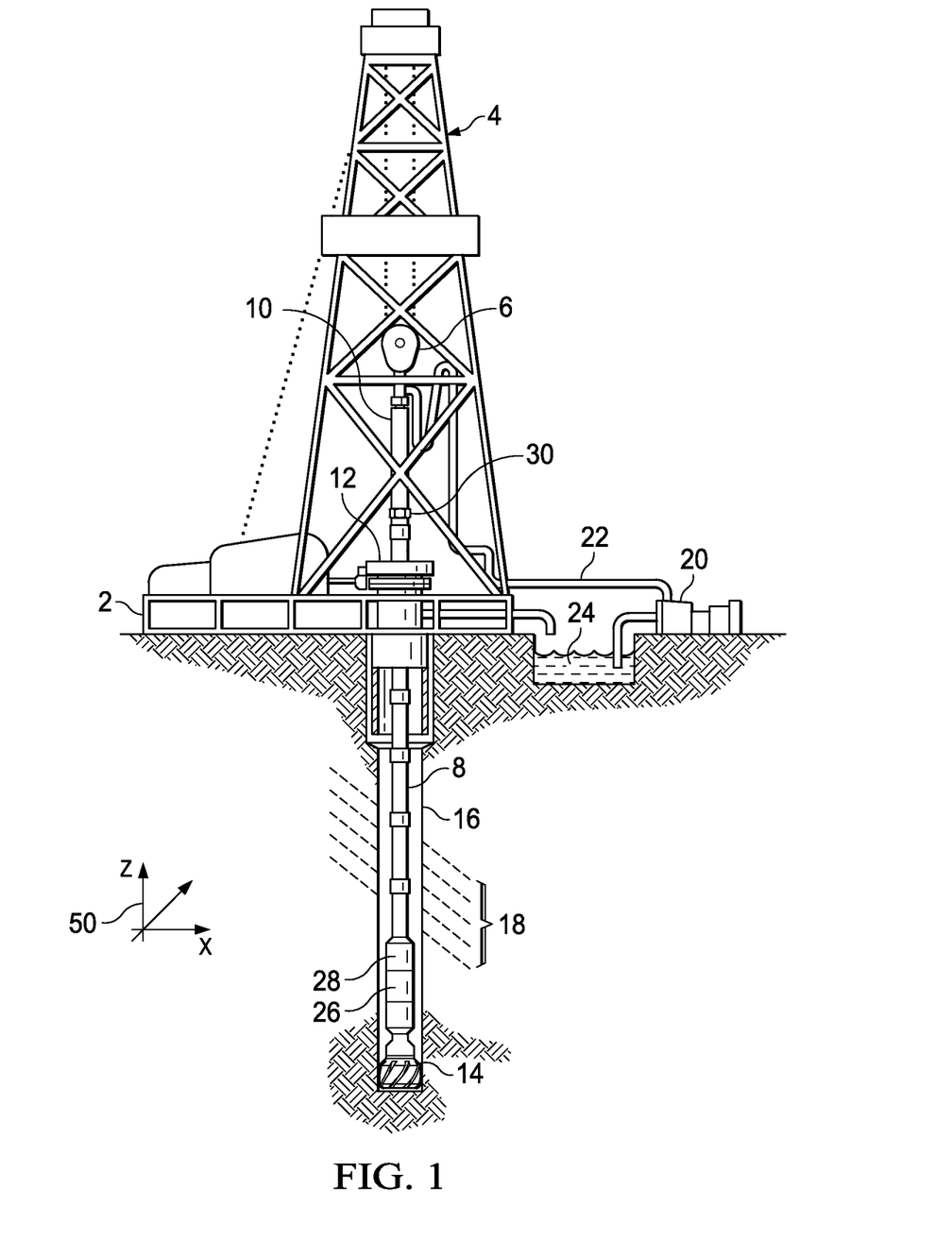
FIG. 1 is a diagram showing an illustrative logging while drilling environment.

The logging tools discussed above and herein may be implemented in any suitable mechanism such as a drilling collar, mandrel, wireline tool, or other suitable device. In some embodiments, such logging tools may be included and/or used in a logging-while-drilling (LWD) environment. FIG. 1 illustrates oil well drilling equipment used in an illustrative LWD environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through one or more formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from borehole 16 into pit 24 and aids in maintaining integrity or borehole 16.

A logging tool 26 may be integrated into the bottom-hole assembly near bit 14 (e.g., within a drilling collar, i.e., a thick-walled tubular that provides weight and rigidity to aid in the drilling process, or a mandrel). In some embodiments, logging tool 26 may be integrated at any point along drill string 8. Logging tool 26 may include gamma-ray receivers and/or gamma-ray sources. In one embodiment, logging tool 26 may communicate received signals to another portion of the illustrative LWD environment. Such signals may be analyzed in the portion of the illustrative LWD environment to which the signals are sent. In another embodiment, logging tool 26 may store received signals. Logging tool 26 may be configured to analyze these signals.

As the bit extends borehole 16 through formations 18, logging tool 26 may collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments. In embodiments including an azimuthal orientation indicator, resistivity and/or dielectric constant measurements may be associated with a particular azimuthal orientation (e.g., by azimuthal binning) A telemetry sub 28 may be included to transfer tool measurements to a surface receiver 30 and/or to receive commands from surface receiver 30.

Figure 2:
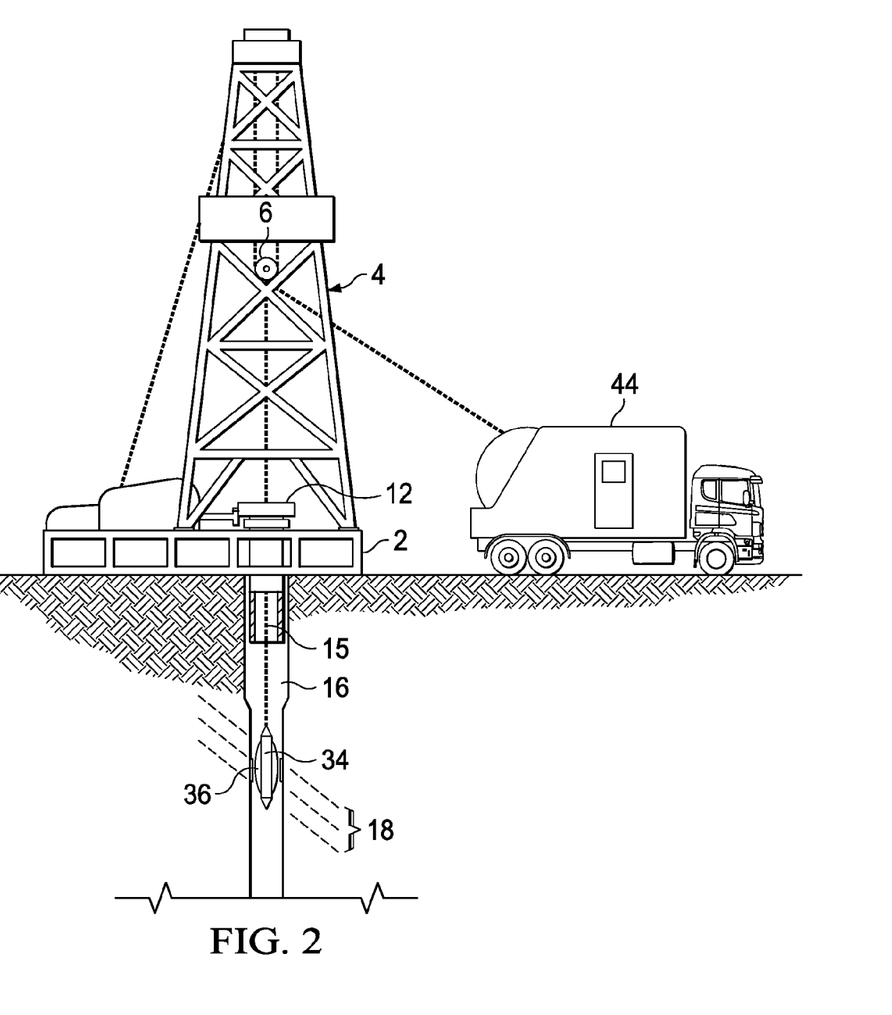
FIG. 2 is a diagram showing an illustrative wireline logging environment.

At various times during the drilling process, drill string 8 may be removed from borehole 16 as shown in FIG. 2. In one embodiment, once the drill string 8 has been removed, logging operations may be conducted using a wireline tool 34. Wireline tool 34 may be implemented by an instrument suspended into borehole 16 by a cable 15 having conductors for transporting power to the tool and telemetry from the tool body to the surface. The wireline tool 34 may include one or more logging tools 36 according to the present disclosure. Logging tool 36 may be communicatively coupled to the cable 15. A logging facility 44 (shown in FIG. 4 as a truck, although it may be any other structure) may collect measurements from the logging tool 36, and may include computing facilities (including, e.g., an information handling system) for controlling, processing, and/or storing the measurements gathered by the logging tool 36. The computing facilities may be communicatively coupled to logging tool 36 by way of cable 15.

Figure 3:
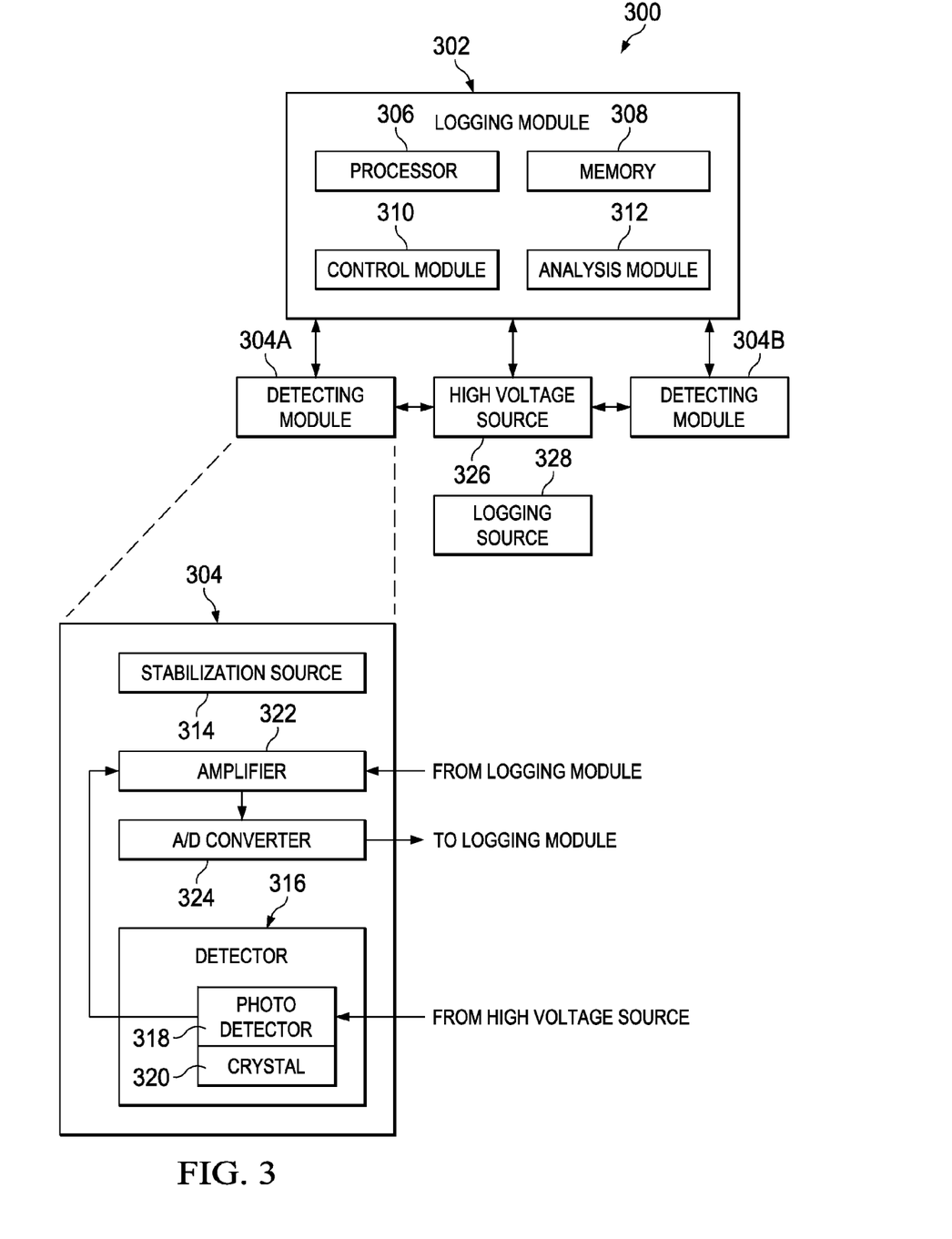
FIG. 3 is an illustration of an example embodiment of a logging tool.

Logging tool 26 and logging tool 36 may be implemented in any suitable manner. FIG. 3 illustrates an example embodiment of a logging tool 300. Logging tool 300 may fully or partially implement logging tool 26 or logging tool 36. In one embodiment, logging tool 300 may include a gamma-gamma density tool. Logging tool 300 may include a logging module 302 communicatively coupled to one or more detecting modules 304. Although logging module 302 and detecting modules 304 are illustrated as separate modules, the functionality of logging tool 300 may be implemented by any suitable kind, number, or combination of components.

Logging module 302 may be configured to control the operation of logging tool 300. Logging module 302 may include a control module 310 and an analysis module 312. Control module 310 may be configured to adjust the high voltage and electronic gains of detectors so as to keep measurement windows within the same channel number of the spectrum. Analysis module 312 may be configured to analyze the information collected by control module 310. Such analysis may include temperature correction of a gamma ray detector. Control module 310 and analysis module 312 may be implemented in any suitable manner, such as by a card, function, library, shared library, script, executable, application, process, computer, information handling system, server, analog hardware, digital hardware, logic, instructions, code, or any suitable combination thereof. Control module 310 and analysis module 312 may be implemented by instructions, code, or logic on a memory 308 for execution by a processor 306.

Processor 306 may be implemented by, for example, a microprocessor, microcontroller, digital signal processor (DSP), application-specific integrated circuit (ASIC), or any other digital or analog circuitry configured to interpret and/or execute program instructions and/or process data. In some embodiments, processor 306 may interpret and/or execute program instructions and/or process data stored in memory 308. Memory 308 may be configured in part or whole as application memory, system memory, or both. Memory 308 may include any system, device, or apparatus configured to hold and/or house one or more memory modules. Each memory module may include any system, device or apparatus configured to retain program instructions and/or data for a period of time (e.g., computer-readable media or machine-readable storage media). Instructions, logic, or data for configuring the operation of logging tool 300, such as configurations of components of control module 310 and analysis module 312, may reside in memory 116 for execution by processor 114.

Logging tool 300 may include any suitable number of detecting modules 304. Although two detecting modules 304 are illustrated in FIG. 3, logging tool 300 may include, for example, one, two, three, or four detecting modules 304. Detecting modules 304 may be arranged in any suitable manner, such as at different locations along the axis of the tool.

Although logging module 302 and detecting modules 304 are both illustrated as resident within a single logging tool 300, logging module 302 and detecting modules 304 may be in the same or different locations. For example, in FIG. 1 both logging module 302 and detecting modules 304 may be implemented in logging tool 26. In the example of FIG. 2, logging module 302 may be implemented in logging facility 44 while detecting modules 304 may be implemented in logging tool 36. Furthermore, control module 310 and analysis module 312 may be implemented in different locations. In the example of FIG. 1, analysis module 312 and control module 310 may be implemented in logging tool 26. In the example of FIG. 2, analysis module 312 may be implemented in logging facility 44 while control module 310 may be implemented in logging tool 36. In another example regarding FIG. 2, portions of control module 310 may be implemented in both logging facility 44 and logging tool 36.

Logging tool 300 may include a high voltage source 326 communicatively coupled to detecting modules 304 and logging module 302. High voltage source 326 may be configured to provide voltage sufficient to power photodetection in detecting modules 304. Logging module 302 may be configured to control the operation of high voltage source 326 by, for example, determining the power, voltage, phase, or current to be supplied by high voltage source 326 to detecting modules 304. In one embodiment, a single high voltage source 326 may be sufficient to provide power to all detecting modules 304. In such an embodiment, high voltage source 326 may be implemented separately than detecting modules 304. In another embodiment, a single detecting module 304 may be used in logging tool 300. In such an embodiment, detecting module 304 may include high voltage source 326. In yet another embodiment, each detecting module 304 may include an instance of high voltage source 326.

Furthermore, logging tool 300 may include a logging source 328. Logging source 328 may be configured to emit gamma rays into the formation, which may then been emitted back to logging tool 300 and detected by detecting modules 304. Such received gamma rays may be used to analyze the properties of the formation. Logging source 328 may be implemented by, for example, a source of radioactive material sufficiently large to generate gamma rays that are emitted into the formation and returned for detection. For example, logging source 328 may be implemented by a quantity of cesium-137. In one embodiment, a single logging source 328 may be used for logging tool 300. If logging tool 300 includes multiple detecting modules 304, logging source 328 may be implemented separately from detecting modules 304. If logging tool 300 includes a single detecting module 304, logging source 328 may be implemented within detecting module 304.

Detecting modules 304 may be implemented in any suitable manner. In one embodiment, detecting module 304 may include a detector 316 and a stabilization source 314. Detector 316 may be communicatively coupled to high voltage source 326 and logging module 302. Detector 316 may be configured to detect and count gamma rays as they are received from the formation. The gamma rays received by the detector may include, in increasing amounts, gamma rays naturally emitted from the formation, gamma rays from a stabilization source 314, and gamma rays from logging source 328 reflected by the formation. While various materials within a formation may emit gamma rays, the majority of the detected gamma rays may originate with logging source 328 and are scattered by the formation. The formation may also scatter gamma rays originating from stabilization source 314. The spectrum of gamma rays received may be analyzed to determine the nature of the formation, such as the lithology of the formation.

As mentioned above, detecting modules 304 may include a stabilization source 314. Stabilization source 314 may be configured to compensate for various variations in measurements made by detector 316. Stabilization source 314 may be positioned in any suitable portion of detecting module. Stabilization source 314 may include a source capable of emitting gamma rays. Such a source may emit high energy gamma rays within a very limited range, such as radioactive isotope cesium-137. The amount of cesium-137 in stabilization source 314 may be relatively small in comparison to logging source 328. Furthermore, detector 316 may be much closer to the position of stabilization source 314 than to the position of logging source 328. The stablization source 314 may be incorporated into detector 316. Given the location of stabilization source 314 to detector 316, most gamma rays of stabilization source 314 detected by detector 316 may include gamma rays directly emitted from stabilization source 314 without being scattered and reflected in the formation. Some of these detected gamma rays emitted within a limited high-energy range may deposit all their energy in detector 316, resulting in a discernible photopeak of detected gamma rays within such a high-energy range. The resultant photopeak or gamma ray counts associated with stabilization source 314 may be of a higher energy than the gamma ray counts associated with the scattered and reflected gamma rays of logging source 328. The measured voltage of a resultant photopeak may be kept relatively at the same level over time and through different uses of logging tool 300. Although logging source 328 and stabilization source 314 may emit gamma rays of the same energy, the position of the sources may thus result in different detection profiles for each by detector 316.

Detector 316 may be configured to detect counts of gamma rays that are received as well as categorize the received gamma rays according to energy channel. The result may be an energy spectrum. Detector 316 may include a substance configured to absorb gamma rays to determine such counts. For example, detector 316 may include a crystal 320 communicatively coupled to a photodetector 318. Crystal 320 may include, for example, sodium iodide or lanthanum bromide crystals that may absorb the gamma rays. The absorption of gamma rays in crystal 320 may be detected by photodetector 318, as the absorption of gamma rays may give off light. Photodetector 318 may be communicatively coupled to high voltage source 326. High voltage source 326 may provide sufficient power for photodetector 318 to determine light emissions from crystal 320. Furthermore, photodetector 318 may be configured to output its signals to any suitable electronics for signal processing.

In one embodiment, detecting module 304 may include electronics for signal processing the results of photodetector 318. In another embodiment, such electronics may be included outside of detecting module 304. The electronics may include, for example an amplifier 322 communicatively coupled to an analog to digital (A/D) converter 324. Amplifier 322 may be configured to amplify signals received from photodetector 318 and pass the results to A/D converter 324. Such amplification may correct for amplitude variations within the detected data. The gains of amplifier 322 may be set by commands received from logging module 302. A/D converter 324 may be configured to convert the analog signals received from photodetector 318 into digital data and send the results to logging module 302.

The ability of detector 316 to sufficiently perform its operations may depend upon the resolution of detector 316. In one embodiment, the resolution of detector 316 may be measured in terms of full width at half maximum (FWHM). FWHM may be determined by evaluating the width of a given gamma ray peak at half of the highest point of the peak. Resolution may be expressed in, for example, relative terms or in electron-Volts (eV).

Various factors may affect the response of detector 316. Variations may be caused by, for example, light output from crystals in detector 316, gain amplification in detector 316, or non-linearities in electronics used to operate detector 316. Various mechanisms, such as stabilization source 314, may be employed to compensate for changes in gain or response of detector 316. In another example, non-linearities may be accounted for when by characterizing logging tool 300 in ambient conditions.

In one embodiment, temperatures may affect the resolution of detector 316. Such temperature effects may manifest themselves by affecting measured counts of various channels. Changing the detector's ability to finely detect gamma rays may change the actual, observed counts.

Figure 4:
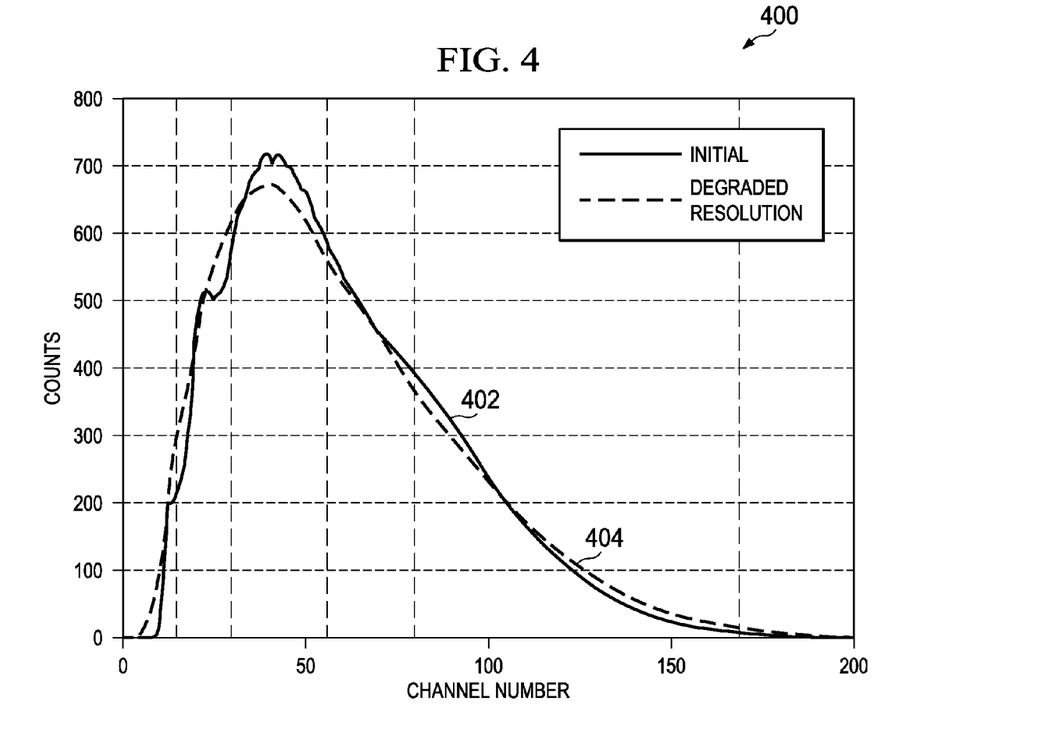
FIG. 4 is a graph with example effects on gamma ray detection by resolution changes due to temperature changes.

FIG. 4 illustrates a graph 400 with example effects of resolution changes on gamma ray detection due to temperature changes. An example of a gamma ray energy spectrum is shown in graph 400, wherein gamma ray counts are mapped on the y-axis and energy or channel identifiers are mapped on the x-axis. The axes of graph 400 may be measured in keV. In the example of FIG. 4, each channel may represent a span of 3 keV.

Graph 400 may illustrate various characteristics of a formation being drilled. The various characteristics may manifest themselves by variations in the energy spectra. These variations may be quantified by grouping a range of channels into windows and summing the gamma ray counts of the window. When the counts are normalized by time, the results are referred to as count rates. Example window groupings may be shown in FIG. 4. Each window may characterize a different aspect of the formation or drilling environment. Count rates from the windows of the one or more detectors may be combined to obtain formation properties such as formation density and formation lithology. For the purposes of example only, the information shown in graph 300 may result from placing drilling tool 300 in a marble block, which may emulate the characteristics of a zero-porosity limestone formation.

An initial response 402 may illustrate received gamma rays given the particular formation and other controlled, standard conditions. The temperature associated with initial response 402 may be room temperature or another suitable ambient temperature. A degraded response 404 may illustrate received gamma rays given the same conditions except for a temperature change. Degraded response 404 may result from a lowered resolution of detector 316. As illustrated in FIG. 4, degraded response 404 may redistribute counts among the windows, thereby changing the counts in the windows.

Accordingly, logging tool 300 may be configured to correct gamma ray measurements based upon an instant resolution of detector 316. Such corrections may be made, for example, in real-time or during post-measurement processing. Consequently, logging tool 300 may be configured to directly measure resolution of detector 316 and utilize the measured resolution to correct for temperature changes.

Logging tool 300 may be characterized such that gamma ray counts in a given formation may be adjusted to account for variations in resolution. Furthermore, logging tool 300 may be repeatedly characterized in this manner for different types of expected formations. The relationship between a given resolution and adjustment of gamma ray counts may be established and defined according to equations, experimental data, look-up tables, functions, or any other suitable mechanism. Such mechanisms may be stored in, for example, memory 308. Thus, given an instant measurement of the resolution of detector 316, correction in gamma ray counts accommodating temperature changes may be made.

Measurement of the resolution of detector 316 may be made by analyzing the gamma ray spectrum of detector 316. Such analysis may be performed by analysis module 312. In one embodiment, analysis module 312 may analyze count rates from the photopeak of stabilization source 314. The photopeak of stabilization source 314 may include a peak of gamma ray counts associated with stabilization source 314. In a further embodiment, the count rates may be analyzed according to narrow energy windows defined adjacent to the photopeak. In another, further embodiment, the count rates may be analyzed according to two such windows. In yet another, further embodiment, the two windows may be defined on the high-energy side of the photopeak. The windows may be of equal width in terms of channel count or eV. The width of the two windows combined may be sufficient to stretch between the channel corresponding to the top count of the photopeak and the channel corresponding to a count rate near zero.

Figure 5:
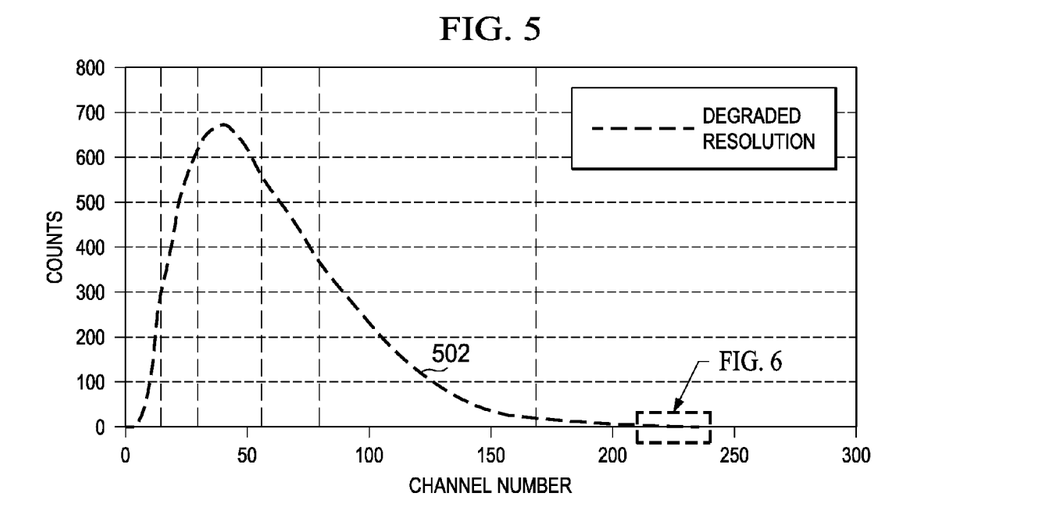
FIG. 5 is a graph of example response measured by a detector during evaluation of a formation

FIG. 5 is an illustration of a graph 500 of example response measured by detector 316 during evaluation of a formation. Graph 500 may include information compiled by, for example, analysis module 312. Within a viewable range suitable to illustrate gamma counts for determining properties such as density and lithology of the formation, a photopeak corresponding to stabilization source 314 may not be visible.

A photopeak may include a distribution of gamma rays corresponding to the energy levels of an original source of such gamma rays. For example, logging source 328 and stabilization source 314 may both emit gamma rays from cesium-137 sources. The energy level of such gamma rays may be, for example, 662 keV. This may correspond to, for example, channel #232. However, logging source 328 may be positioned such that its emitted gamma rays do not flow directly to detector 316. Any gamma rays received at detector 316 as a result of emissions from logging source 328 may have first travelled into the formation and are subsequently scattered. The scattering may lessen the energy of the gamma rays. Accordingly, the plot of gamma ray counts illustrated in graph 500 between channel #0 and channel #200 may correspond to such gamma rays that were originally emitted by logging source 328 that entered the formation, were scattered, and are now detected as having less energy than 662 keV. Therefore, no photopeak might be available in graph 500 associated with logging source 328. In contrast, the proximity of stabilization source 314 to detector 316 may result in high-energy gamma rays of stabilization source 314 depositing all of their energy in detector 316, instead of such gamma rays first dispersing into the formation, scattering, and then being detected. Accordingly, a photopeak of stabilization source 314 should appear in graph 500 at the energy level of the high-energy gamma rays emitted by stabilization source 314. For example, a photopeak of stabilization source 314 may appear at channel #232.

Figure 6:
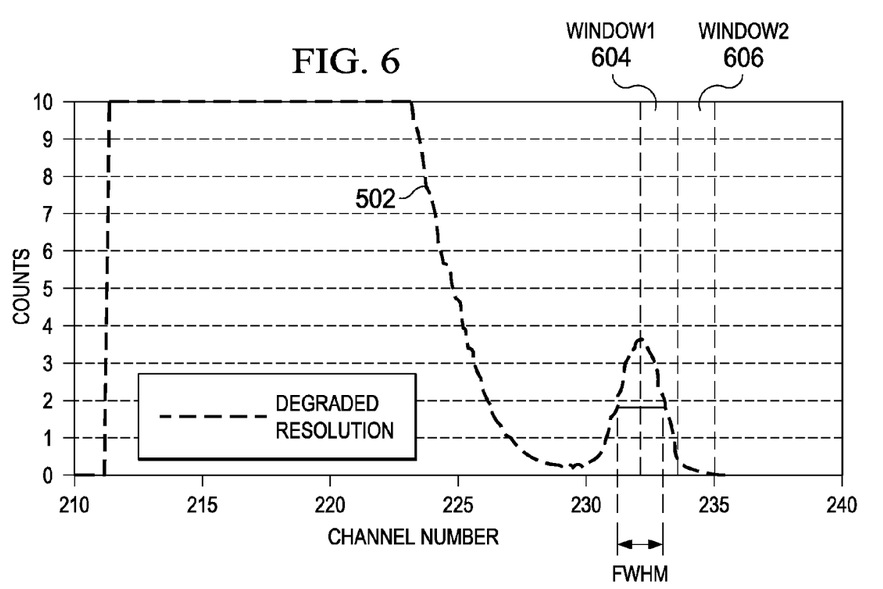
FIG. 6 is a more detailed graph of example response measured by a detector during evaluation of a formation.

FIG. 6 is a more detailed illustration of graph 500 of example response measured by detector 316 during evaluation of a formation. In FIG. 6, gamma counts corresponding to the lower-energy portion of the spectrum may be cut off (as such measurements are too high) so that a photopeak corresponding to stabilization source 314 may be illustrated. In the example of FIG. 6, such a photopeak corresponding to stabilization source 314 may be centered on approximately channel #232. The photopeak may be generated by stabilization source 314. In various embodiments, the photopeak may include a Gaussian distribution. However, the photopeak may be distorted by a pile-up of lower-energy signals.

Logging tool 300 may measure the resolution of detector 316 by analyzing the photopeak corresponding to stabilization source 314. In one embodiment, logging tool 300 may analyze the photopeak by determining energy resolution of the photopeak. For example, logging tool 300 may analyze the photopeak by measuring, indirectly, the FWHM. In another example, logging tool 300 may analyze the photopeak by measuring the photopeak's peak standard deviation. In another embodiment, logging tool 300 may analyze the photopeak by using consecutive windows of channels or ranges of channels. The counts of gamma rays within a given window may be counted. In yet another embodiment, logging tool 300 may analyze the photopeak by using windows on the high-energy side of the photopeak. Such a high-energy side may be indicated by channel numbers higher than the photopeak. By using windows on the high-energy side of the photopeak, errors due to gamma rays generated by the formation and collected on the low-energy side may be avoided.

Thus, logging tool 300 may calculate the gamma ray counts in window1 604 and in window2 606. Logging tool 300 may divide the counts determined in window2 606 by the counts determined in window1 604 to find a resolution ratio. The resolution ratio may be generally smaller when resolution of detector 316 is better. The resolution ratio may thus be generally smaller when the photopeak is sharper.

The correlation between resolution ratio and resolution of detector 316 may be established in any suitable manner. For example, the relationship between resolution and resolution ratios may be determined through characterizations using different temperatures (and thus resolutions). The result may be expressed in, for example, functions, look-up tables, or linear approximations of the data points. In another example, assuming that the photopeak follows Gaussian distribution, the Gaussian peak values and widths of windows may similarly yield functions.

Figure 7:
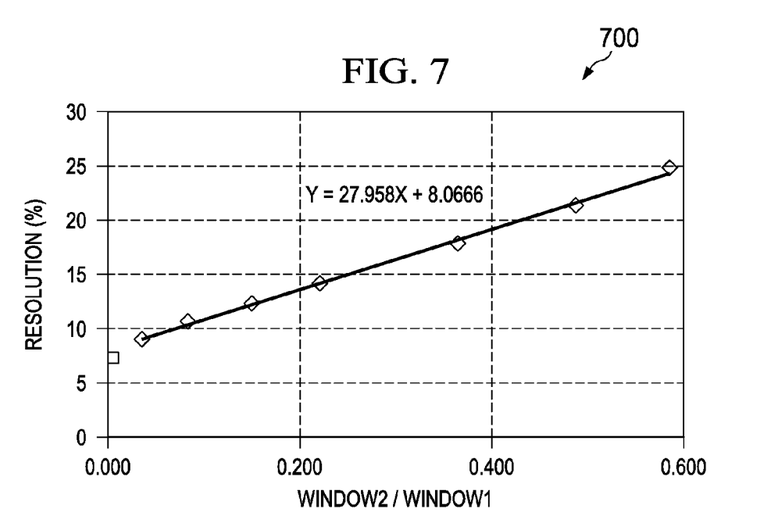
FIG. 7 is a graph of example relationships between full width at half maximum and resolution ratios

FIG. 7 illustrates a graph 700 of example relationships between resolution (such as FWHM) and resolution ratios. Graph 700 may express a function to determine resolution given a resolution ratio. In the example of FIG. 7, assuming that window1 604 and window2 606 are 51 keV wide and that the photopeak is 662 keV, the relationship between resolution and resolution ratio may be largely linear between approximately 8% resolution and 25% resolution. The function may be expressed as resolution=27.958(resolution ratio)+8.0666. Given other distributions, other results may arise. The relationships between resolution and resolution ratios may be stored in, for example, memory 308.

In operation, logging tool 300 may make measurements of gamma rays during drilling of formation 18. Control module 310 may issue commands to detecting module 304, to the extent that components of detecting module 304 may be enabled or tunable. For example, control module 310 may enable and control high voltage source 326 and each instance of amplifier 322. Stabilization source 314 and logging source 328 may emit gamma rays. The powering of each instance of photodetector 318 may enable detector 316 to begin recording gamma ray counts from formation 18 and stabilization source 314.

Each instance of photodetector 318 may observe light given off by reactions of the gamma rays in respective instances of crystal 320. Photodetector 318 may generate signals indicating quantifications of the observed light and pass the signals to amplifier 322. Amplifier 322 may apply gains specified by logging module 302 to the signals and pass the result to A/D converter 324 for conversion to digital data. The resultant digital data may be sent to analysis module 312.

The counts may be organized according to channel or energy level. Analysis module 312 may determine the resultant photopeaks for instances of stabilization source 314. Such a photopeak may be located at a higher channel than the counts associated with formation characteristics and may be centered at the channel at which stabilization source 314 emits gamma rays.

Once the photopeak of stabilization source 314 is determined, two consecutive windows adjacent to the channel of the photopeak may be selected for use in resolution determination. The two windows may be pre-determined or calculated. If the high voltage and or electronic gains are being adjusted to keep the photopeak in the same energy channel, then the two consecutive windows might always span the same channels. Otherwise, the window channels may be determined based on the peak location. The two windows may be on the high-energy side of the photopeak. The windows may be of a predetermined width, or may be selected such that the two windows reach a channel with a gamma ray count rate of near zero.

Analysis module 312 may count the total gamma rays in the first window, adjacent to the photopeak. Furthermore, analysis module 312 may count the total gamma rays in the second window, adjacent to the first window. In addition, analysis module 312 may determine the ratio of the count of the second window to the count of the first window. This ratio may be the resolution ratio.

Given the resolution ratio, analysis module 312 may determine a resolution value based upon the resolution ratio. The determination may be made by, for example, a function, look-up table, or other mechanism. Given the resolution value, analysis module 312 may determine a gamma ray correction amount. The gamma ray correction determination may be made by, for example, a function, look-up table, or other mechanism. Analysis module 312 may apply a gamma ray correction to count rates obtained for the various energy windows of the spectrum. Alternatively or in addition, analysis module 312 may apply a gamma ray correction to formation properties computed from uncorrected count rates. Characteristics such as density and lithology may thus be corrected. This correction may be based upon the resolution changes which in turn may have been caused by temperature changes. Given corrected characteristics, information about formation 18 may be accurately used for further analysis or drilling guidance.

Analysis module 312 may separately analyze the data for each instance of detecting module 304. The results of each such analysis may all be used as appropriate for formation analysis.

Figure 8:
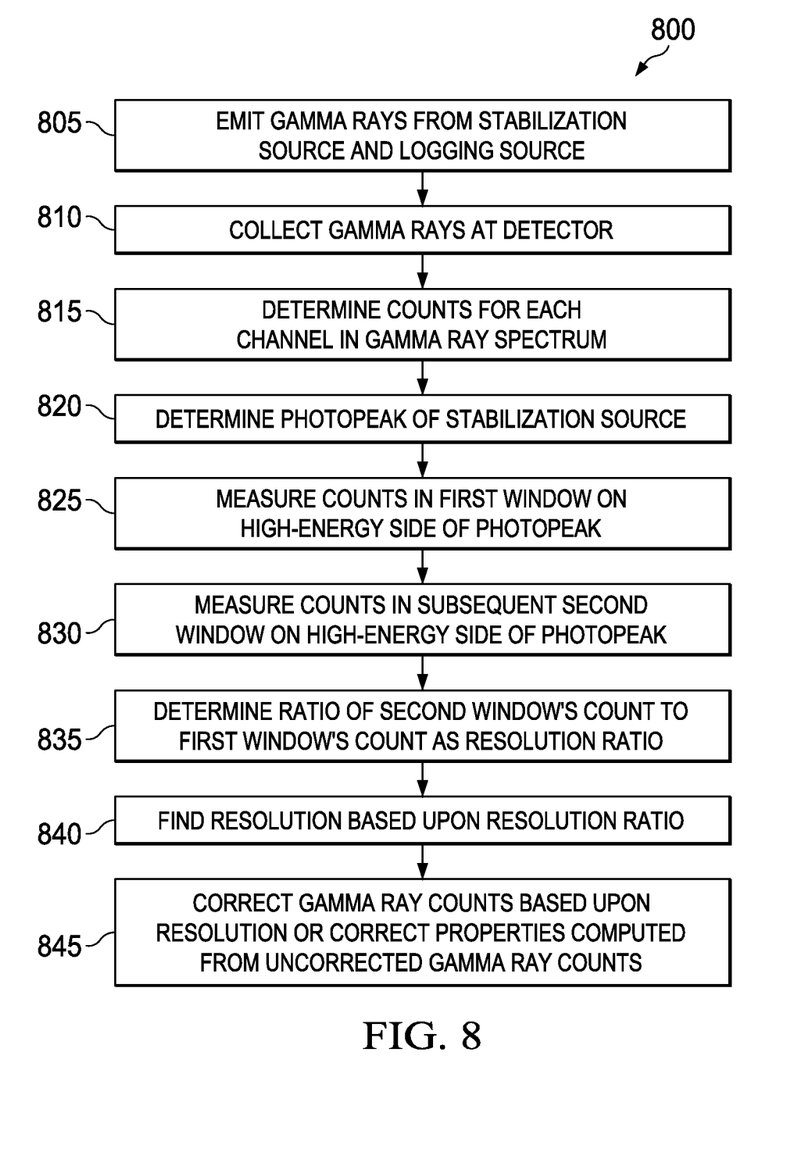
FIG. 8 is an illustration of an example method for temperature correction of a gamma detector.

FIG. 8 is an illustration of an example method 800 for temperature correction of a gamma detector. Although FIG. 8 discloses a particular number of steps to be taken with respect to example method 800, method 800 may be executed with more or fewer steps than those depicted in FIG. 8. In addition, although FIG. 8 discloses a certain order of steps to be taken with respect to method 800, the steps of these methods may be completed in any suitable order. Method 800 may be implemented using the system of FIGS. 1-7 or any other suitable mechanism. In certain embodiments, method 800 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 800 may be provided as a computer program product that may include one or more machine readable media having stored thereon instructions that may be used to program a processing system or other electronic device to perform the methods.

In some embodiments, method 800 may begin at 805. Method 800 may be used in conjunction with a logging tool, such as logging tool 300, present within a formation. At 805, the gamma rays from a stabilization source of the logging tool may be emitted. At 810, gamma rays emitting from the formation and associated with the emission by the stabilization source may be collected. Such collection may be performed by a gamma ray detector of the logging tool.

At 815, gamma ray spectra may be acquired. As such, counts of gamma rays for a range of channels or energy levels may be determined. The counts at each channel may form a gamma ray spectrum. The counts of the various channels may be used for determining characteristics of the formation such as density and lithology.

At 820, a photopeak of the stabilization source may be determined within the gamma ray spectrum. In one embodiment, such a photopeak may be at a higher channel count or energy level than channels associated with characteristics such as density and lithology, or higher than channels associated with a logging source. The magnitude of the gamma counts for the photopeak may be much smaller than the gamma counts of the characteristics such as density and lithology. Once a channel count of the photopeak is determined, two channel windows may be established. Such windows may be of the same channel width. In addition, the windows may be consecutive without a channel gap. Furthermore, such windows may be located on the high-energy side of the photopeak. At 825, the counts within the first window on the high-energy side of the photopeak may be determined. At 830, the counts within the second window on the high-energy side of the photopeak may be determined.

At 835, a resolution ratio of the second window's count to the first window's count may be determined. Given the resolution ratio, at 840 a resolution measurement, such as FWHM expressed in percentage, may be determined with a function, look-up table, or other suitable relationship expression. At 845, given the resolution, a correction to the computation of formation characteristics may be made. In one embodiment, a correction for gamma ray counts in channels associated with characteristics such as density and lithology may be made. The correction may be made given the resolution and a function, look-up table, or other suitable relationship expression. Once corrected gamma ray counts have been determined, the characteristics may be evaluated and, consequently, the formation. In another embodiment, the formation properties may be computed with uncorrected count rates and then corrected for resolution.

As would be appreciated by those of ordinary skill in the art, with the benefit of this disclosure, in one exemplary embodiment, the methods, systems, and apparatus disclosed herein may be implemented using an information handling system. In one embodiment, each of the one or more detectors of a logging tool may be communicatively coupled to an information handling system through a wired or wireless network. Operations of such systems are well known to those of ordinary skill in the art and will therefore not be discussed in detail herein. The information handling system may control generation, transmission, and/or receipt of signals received from each detector to analyze a subterranean formation. Specifically, software including instructions in accordance with the methods disclosed herein may be stored in computer-readable media of an information handling system. The information handling system may then use those instructions to carry out the methods disclosed herein. In one exemplary embodiment, the information handling system may store the values of the measured signal in each of multiple iterations as it carries out the methods disclosed herein. In one embodiment, the information handling system may include a user interface that may provide information relating to formation properties to a user in real time.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A logging tool comprising:
   a stabilization source configured to emit a first plurality of gamma rays;
   a logging source configured to emit a second plurality of gamma rays;
   a gamma ray detector configured to collect:
      the first plurality of gamma rays emitted by the stabilization source; and
      a third plurality of gamma rays including reflections from a formation of the second plurality of gamma rays emitted by the logging source; and
   an analysis module including instructions on a non-transitory computer-readable medium, the instructions, when loaded and executed by a processor, configure the analysis module to:
      calculate an energy spectrum of the first and third pluralities of gamma rays collected by the gamma ray detector;
      determine a photopeak associated with the first plurality of gamma rays in the energy spectrum, the photopeak having a higher energy than the third plurality of gamma rays; and
      perform resolution calculations using the photopeak to determine a resolution of the gamma ray detector.

2. The logging tool of claim 1, wherein performing resolution calculations comprises:
   determining a sum of gamma ray counts of a first window in the energy spectrum of gamma rays, the first window adjacent to the photopeak;
   determining a sum of gamma ray counts of a second window in the energy spectrum of gamma rays; and
   determining a ratio of the sum of the second window to the sum of the first window.

3. The logging tool of claim 2, wherein the first window and the second window are on a high-energy side of the photopeak.

4. The logging tool of claim 2, wherein performing resolution calculations further comprises determining resolution from the determined ratio.

5. The logging tool of claim 1, wherein the instructions further configure the analysis module to correct formation properties based upon the determined resolution of the gamma ray detector.

6. The logging tool of claim 1, wherein the instructions further configure the analysis module to correct gamma ray counts based upon the determined resolution of the gamma ray detector.

7. The logging tool of claim 1, wherein the instructions further configure the analysis module to make corrections based upon the determined resolution of the gamma ray detector, wherein the corrections include variations due to temperature changes experienced by the logging tool.

8. A method of analyzing a formation, comprising:
   collecting, at a gamma ray detector:
      a first plurality of gamma rays emitted from a stabilization source; and
      a third plurality of gamma rays including reflections from a formation of a second plurality of gamma rays emitted from a logging source;
   calculating, at a logging tool, an energy spectrum of the first and third pluralities of gamma rays collected by the gamma ray detector;
   determining, at the logging tool, a photopeak associated with the first plurality of gamma rays in the energy spectrum, the photopeak having a higher energy than the third plurality of gamma rays; and
   performing, at the logging tool, resolution calculations using the photopeak to determine a resolution of the gamma ray detector.

9. The method of claim 8, wherein performing resolution calculations comprises:
   determining a sum of gamma ray counts of a first window of the energy spectrum of gamma rays, the first window adjacent to the photopeak;
   determining a sum of gamma ray counts of a second window of the energy spectrum of gamma rays;
   determining a ratio of the sum of the second window to the sum of the first window.

10. The method of claim 9, wherein the first window and the second window are on a high-energy side of the photopeak.

11. The method of claim 9, wherein performing resolution calculations further comprises determining resolution from the determined ratio.

12. The method of claim 8, further comprising correcting formation properties based upon the determined resolution of the gamma ray detector.

13. The method of claim 8, further comprising correcting gamma ray counts based upon the determined resolution of the gamma ray detector.

14. The method of claim 8, further comprising making corrections based upon the determined resolution of the gamma ray detector, wherein the corrections include variations due to temperature changes experienced by the logging tool.

15. An article of manufacture, comprising a non-transitory computer-readable storage medium, the computer-readable storage medium including machine-executable instructions, the instructions readable by a processor and, when read and executed, configured to cause the processor to:
   calculate an energy spectrum of gamma rays collected by a gamma ray detector, the gamma rays including:
      a first plurality of gamma rays emitted from a stabilization source; and
      a third plurality of gamma rays including reflections from a formation of a second plurality of gamma rays emitted from a logging source,
   determine a photopeak associated with the first plurality of gamma rays in the energy spectrum, the photopeak having a higher energy than the third plurality of gamma rays; and
   perform resolution calculations using the photopeak to determine a resolution of the gamma ray detector.

16. The article of claim 15, wherein performing resolution calculations comprises:

determining a sum of gamma ray counts of a first window of the energy spectrum of gamma rays, the first window adjacent to the photopeak;

determining a sum of gamma ray counts of a second window of the energy spectrum of gamma rays;

determining a ratio of the sum of the second window to the sum of the first window.

17. The article of claim 16, wherein the first window and the second window are on a high-energy side of the photopeak.

18. The article of claim 16, wherein performing resolution calculations further comprises determining resolution from the determined ratio.

19. The article of claim 15, further comprising instructions configured to cause the processor to correct formation properties based upon the determined resolution of the gamma ray detector.

20. The article of claim 15, further comprising instructions configured to cause the processor to correct gamma ray counts based upon the determined resolution of the gamma ray detector.

* * * * *